United States Patent
Toyoda et al.

(10) Patent No.: US 6,685,865 B2
(45) Date of Patent: Feb. 3, 2004

(54) PROCESS FOR PRODUCING A BIAXIALLY ORIENTED POLYESTER FILM AND BIAXIALLY ORIENTED POLYESTER FILM

(75) Inventors: Katsuya Toyoda, Shiga (JP); Satoru Nishino, Shiga (JP); Toshiya Nishibayashi, Osaka (JP)

(73) Assignee: Toray Industries, Inc. (JP)

( * ) Notice: Subject to any disclaimer, the term of this patent is extended or adjusted under 35 U.S.C. 154(b) by 0 days.

(21) Appl. No.: 09/937,939

(22) PCT Filed: Feb. 2, 2001

(86) PCT No.: PCT/JP01/00730
§ 371 (c)(1),
(2), (4) Date: Oct. 23, 2001

(87) PCT Pub. No.: WO01/56770
PCT Pub. Date: Aug. 9, 2001

(65) Prior Publication Data
US 2002/0155268 A1 Oct. 24, 2002

(30) Foreign Application Priority Data
Feb. 3, 2000  (JP) .......................................... 2000-26628

(51) Int. Cl.⁷ .......................... B29C 55/16; B29C 55/10; B29C 55/12; B29C 55/14; B32B 27/36

(52) U.S. Cl. ................. 264/290.2; 264/280; 264/288.4; 428/480; 428/910

(58) Field of Search ................................ 428/480, 910; 264/288.4, 290.2, 280

(56) References Cited

U.S. PATENT DOCUMENTS

| | | | | | |
|---|---|---|---|---|---|
| 4,226,826 A | * | 10/1980 | Motegi et al. | ........... | 264/235.8 |
| 5,096,773 A | * | 3/1992 | Sakamoto | .................... | 428/323 |
| 5,376,711 A | * | 12/1994 | Fujimoto et al. | ........... | 524/430 |
| 5,753,377 A | * | 5/1998 | Takahashi et al. | .......... | 428/480 |
| 5,948,525 A | * | 9/1999 | Kimura et al. | .............. | 428/339 |
| 6,197,430 B1 | * | 3/2001 | Asakura et al. | ............. | 428/480 |

* cited by examiner

Primary Examiner—Vivian Chen
(74) Attorney, Agent, or Firm—Piper Rudnick LLP

(57) ABSTRACT

The present invention is directed to a process for producing a biaxially oriented polyester film which comprises: subjecting a polyester film to simultaneous biaxial stretching in a stretching apparatus constructed to simultaneously stretch the film in the lengthwise and widthwise directions thereof; and subsequently subjecting the film to successive biaxial stretching in the lengthwise and widthwise directions thereof in the same apparatus as mentioned above. With this process, a film can be efficiently formed, without film breaking, which film is small in thickness and greatly strong in its lengthwise and widthwise directions.

4 Claims, No Drawings

PROCESS FOR PRODUCING A BIAXIALLY ORIENTED POLYESTER FILM AND BIAXIALLY ORIENTED POLYESTER FILM

TECHNICAL FIELD

The present invention relates to a process for the production of a polyester film and more particularly to such a process that can efficiently form, without involving troublesome film breakage, a polyester film having small thickness and great strength in its lengthwise and widthwise directions.

Further, this invention relates to a biaxially oriented polyester film that is obtained by the above process.

BACKGROUND ART

Simultaneous biaxial orientation is known in which a thermoplastic film is allowed to simultaneously stretch both lengthwise and widthwise while it is being clamped at its end portions with clips. The technique of orientation stated here is disclosed for instance in Japanese Unexamined Patent Application Publication No. 49-40369 and No. 49-105877.

However, this conventional simultaneous biaxial orientation has the problem that it fails to give a film having improved strength in its lengthwise and widthwise directions even when a film to be oriented is caused to stretch up to a point directly adjacent to the critical point at which the film breaks, such that the film is made rather thin and very strong in the lengthwise and widthwise directions.

An object of the present invention is to provide a process that can form, without film breakage, a film having small thickness and great strength in its lengthwise and widthwise directions.

DISCLOSURE OF THE INVENTION

In order to solve the foregoing problem, the process for the production of a biaxially oriented polyester film according to the present invention comprises: subjecting a polyester film to simultaneous biaxial stretching in a stretching apparatus constructed to simultaneously stretch the polyester film in the lengthwise and widthwise directions thereof, and subsequently subjecting the polyester film to successive biaxial stretching in the lengthwise direction and successively in the widthwise directions in the same apparatus used in which the simultaneous biaxial stretching was performed.

Namely, in the process according to this invention, a polyester film is simultaneously biaxially stretched lengthwise and widthwise at a relatively low stretch ratio, followed by gradual stepwise biaxial stretching while the stretch temperature is being raised in the same apparatus as used for the simultaneous biaxial stretching while the stretch temperatures are being raised. Thus, a film structured to have enhanced strength in the lengthwise and widthwise directions, or a film structured to have small thickness is stably obtainable with no fear of film breakage.

BEST MODE OF CARRYING OUT THE INVENTION

The polyester used in the present invention is composed predominantly of an aromatic dicarboxylic acid, an alicyclic dicarboxylic acid or an aliphatic dicarboxylic acid and a diol. Aromatic dicarboxylic acid components are chosen., for example., from terephthalic acid, isophthalic acid, phthalic acid, 1,4-naphthalene-dicarboxylic acid, 1,5-naphthalenedicarboxylic acid, 2,6-naphthalenedicarboxylic acid, 4,4'-diphenyldicarboxylic acid, 4,4'diphenyletherdicarboxylic acid and 4,4'-diphenylsulfonedicarboxylic acid. Of these components, terephthalic acid, phthalic acid and 2,6-naphthalenedicarboxylic acid are preferred. Alicyclic dicarboxylic acid components are chosen for example from cyclohexanedicarboxylic acid. Aliphatic dicarboxylic acid components are chosen for example from adipic acid, suberic acid, sebacic acid and dodecanedionic acid. The acid components listed here can be used singly, or two or more such components can be used in combination. These components may also be partially copolymerized with an oxy acid such as hydroxyethoxybenzoic acid.

On the other hand, diol components are chosen for example from ethylene glycol, 1,2-propanediol, 1,3-propanediol, neopentyl glycol, 1,3-butanediol, 1,4-butanediol, 1,5-pentanediol, 1,6-hexanediol, 1,2-cyclohexanedimethanol, 1,3-cyclohexanedimethanol, 1,4-cyclohexanedimethanol, diethylene glycol, triethylene glycol, polyalkylene glycol and 2,2'-bis(4'-β-hydroxy-ethoxyphenyl) propane, among which ethylene glycol, 1,4-butanediol, 1,4-cyclohexanedimethanol and diethylene glycol are preferred. Ethylene glycol is a particularly preferable choice. These diol components can be used alone or in combination. The polyester according to this invention may have another monofunctional compound copolymerized in the molecular structure, which compound is trimellitic acid, pyromellitic acid, glycerol, pentaerythritol, 2,4-dioxybenzoic acid, lauryl alcohol or phenylisocyanic acid, when the resulting polymer is substantially linear in nature.

The polyester resin specified above as constituting the polyester film of this invention can be mixed, where desired, with a flame retardant, a heat stabilizer, an antioxidant, an ultraviolet absorber, an antistatic agent, a pigment, an organic lubricant such as a fatty acid ester or a wax, or a defoamer. In addition, the polyester resin may contain inorganic particles composed of clay, mica, titanium oxide, calcium carbonate, kaolin, talc, dry- or wet-type silica, colloidal silica, calcium phosphate, barium sulfate, alumina and zirconia, or organic particles composed of acrylic acid and styrene. Alternatively, deposits generally called internal particles may be added, which results from the action of a catalyst used in a polyester polymerization reaction. A surfactant may also be added.

In the present invention, polyethylene tere-phthalate is particularly effective amongst the polyesters mentioned above. Polyesters having polyethylene terephthalate in a content of 70% by mol or more offer noticeable results, but this is not limiting to this invention. Each such polyester may be of a homopolymeric or copolymeric nature, or a simple blend with other components in an arbitrary content of, for example, less than 30% by mol.

Moreover, the polyester film may be single- or multi-layered in structure.

In the present invention, it is desired that the polyester film to be subjected to simultaneous biaxial stretching be a substantially unoriented film with a birefringence of not larger than 0.003. Higher orientation is not favored as it impairs stretchability and invites film breakage during stretching.

The substantially unoriented polyester film stated above can be formed for example by casting a molten polyester film onto the surface of a cooling drum being rotated, which molten film is extruded from a slitted die, and by successively solidifying the cast film on the drum. To enhance casting of the polyester film onto the cooling drum, thereby forming a desired unoriented film, there may be employed a so-called electrostatic casting method in which a high voltage is applied to an electrode straddled between a die and a cooling drum so that a molten film is electrostatically charged, a method in which film bonding is made strong by the surface tension of water spread between a cooling drum and a molten film, or a method in which the principles of the first two methods are combined.

In the process for producing a biaxially oriented polyester film according to the present invention, a polyester film is required to be simultaneously stretched biaxially lengthwise and widthwise in a stretching apparatus constricted to simultaneously stretch a polyester film in its lengthwise and widthwise directions, followed by the successive biaxial stretching of the film in the two directions in the same apparatus as used for the simultaneous biaxial stretching. In the case where the simultaneous biaxial stretching finishes with a polyester film stretched up to a point directly adjacent to the critical point at which the film breaks, no improved strength is found. Even when the simultaneous biaxial stretching is completed and then repeated with a polyester film likewise stretched up to a point near to the film breakage-inducing point, no improved strength is obtained. When a polyester film is stretched monoaxially, that is, in either one of the lengthwise and widthwise directions after completion of the simultaneous biaxial stretching, improved strength can be achieved in the direction where stretching has been effected. In this instance, however, the direction lying normal to the stretched direction shows a sharp decline in strength. When asimultaneous biaxial stretching is performed subsequently to successive biaxial stretching, the polyester film becomes excessively oriented particularly at its end portions, thus causing breakage readily at from the film end portions. When a successive biaxial stretching follows a successive biaxial stretching, the film somewhat produces high strength in the lengthwise and widthwise directions. In this instance, however, it is difficult to control the film properties in the two directions so that a polyester film having desirable physical properties is not obtainable, and high yield is not achievable due to complicated process steps.

In the simultaneous biaxial stretching according to the present invention, the stretch temperature is preferably a temperature (T1) in the range of Tg+5° C. to Tg+40° C. Tg being the glass transition temperature of polyester. Stretch temperatures of lower than (Tg+5° C.) are undesirable because a polyester film is liable to break during stretching or during stretching after the simultaneous biaxial stretching. Conversely, stretch temperatures of higher than (Tg+40° C.) suffer from so-called flow stretching so that the film causes irregular thickness, or fails to become effectively oriented. The stretch temperature for use in the simultaneous biaxial stretching is more preferably in the range of (Tg+10° C.) to (Tg+35° C.), still more preferably in the range of (Tg+15° C.) to (Tg+30° C.).

In the simultaneous biaxial stretching according to the present invention, the stretch ratio is preferably in the range of 2.0 times to 4.0 times in the lengthwise and widthwise directions of a polyester film. If the stretch ratio is not larger than 2.0 times, the polyester film does not effectively orient and hence fails to produce high strength. Conversely, if the stretch ratio is not smaller than 4.0 times, the polyester film is liable to break during successive biaxial stretching in steps subsequently to the simultaneous biaxial stretching. The stretch ratio for use in the simultaneous biaxial stretching is more preferably in the range of 2.2 times to 3.8 times, still more preferably in the range of 2.5 times to 3.5 times.

In the successive biaxial stretching according to the present invention that is performed subsequently to the simultaneous biaxial stretching, the stretch temperature (T2) for monoaxial stretching at a first stage is preferably in the range of (T1+30° C.) to (Tm−30° C.) (where Tm is the melting point (° C.) of polyester). Stretch temperatures (T2) of lower than (T1+30° C.) make a polyester film breakable because of an insufficient amount of heat, whereas T2 of higher than (Tm−30° C.) causes the film to thermally crystallize to too high a degree and hence invite irregular thickness or film breakage. T2 is more preferably in the range of (T1+40° C.) to (Tm−40° C.), still more preferably in the range of (T1+50° C.) to (Tm−50° C.).

In the successive biaxial stretching according to the present invention that is performed subsequently to the simultaneous biaxial stretching, the stretch ratio for monoaxial stretching at a first stage is preferably in the range of 1.05 times to 2.0 time. If the stretch ratio is not larger than 1.05 times, film strength is not sufficiently improved. Conversely, if the stretch ratio is not smaller than 2.0 times, film breakage is likely to occur during monoaxial stretching at the first stage or during monoaxial stretching to be effected at a right angle at a second stage after the first monoaxial stretching. The monoaxial stretch ratio at the first stage is more preferably in the range of 1.1 times to 1.9 times, still more preferably in the range of 1.2 times to 1.8 times.

In the successive biaxial stretching according to the present invention that is performed subsequently to the simultaneous biaxial stretching, the stretch temperature (T3) for monoaxial stretching to be conducted at a right angle at the second stage after the first monoaxial stretching is preferably in the range of T2 to (Tm−20° C.). Stretch temperatures (T3) of lower than T2 cause film breakage because of an insufficient heat amount, while T3 of higher than (Tm−20° C.) leads to excessive thermal crystallization and results in thickness irregularity or film breakage. T3 is more preferably in the range of (T2+10° C.) to (Tm−30° C.), still more preferably in the range of (T2+20° C.) to (Tm−40° C.).

In the successive biaxial stretching according to the present invention that is performed subsequently to the simultaneous biaxial stretching, the stretch ratio for monoaxial stretching to be effected at a right angle at the second stage after the first monoaxial stretching is preferably in the range of 1.05 times to 2.0 times. If the stretch ratio is not larger than 1.05 times, film strength is not sufficiently improved. Conversely, if the stretch ratio is not smaller than 2.0 times, film breakage is liable to occur. The monoaxial stretch ratio at the second stage is more preferably in the range of 1.1 times to 1.9 times, still more preferably in the range of 1.2 times to 1.8 times.

Upon completion of the successive biaxial stretching, it is desired that heat treatment be effected at a temperature in the range of T3 to (Tm−10° C.). If the temperature for heat treatment is lower than T3, stresses applied by stretching cannot be fully relaxed so that the film causes poor dimensional stability under heat. When the temperature for heat treatment is higher than (Tm−10° C.), film strength extremely deteriorates, and in some instances, film breakage takes place due to partial film melting. The heat treatment temperature is more preferably in the range of (T3+10° C.) to (Tm−20° C.), still more preferably in the range of (T3+20° C.) to (Tm−30° C.).

To perform the simultaneous biaxial stretching according to the present invention, a stretching apparatus should desirably be used which is so constructed that a polyester film is clamped at its end portions with clips and is simultaneously stretched both lengthwise and widthwise upon enlargement of the distance between the clips. The same apparatus should be used to perform the successive biaxial stretching according to this invention that is effected subsequently to the simultaneous biaxial stretching.

Upon completion of the successive biaxial stretching after the simultaneous biaxial stretching, heat treatment can be conducted with either one of a stretching apparatus in which the distance between clips is variable, a stretching apparatus in which the distance between clips is permanent, and a set of heated rolls. Besides and desirably, the film may be relaxed in a lengthwise direction and/or in a widthwise direction at a cooling step after heat treatment so that dimensional stability under heat is enhanced in the lengthwise direction and/or in the widthwise direction. In the stretching apparatus in which the distance between clips is permanent, film relaxation is impossible in a lengthwise direction. In the heated rolls, excessive film relaxation in a lengthwise direction causes unacceptable film zigzagging. To efficiently relax the polyester film in the lengthwise and widthwise directions, the stretching apparatus with the distance between clips set variable is desired. Film relaxation is effected preferably in the range of 0% to 10% in each of the two film directions so as to obtain a polyester having good flatness.

In the present invention, simultaneous biaxial stretching, successive biaxial stretching after such first stretching, and heat treatment are effected in a single stretching apparatus and without clip clamping released on the way. This simplifies process steps and also prevents serious film breaking.

In the successive biaxial stretching according to the present invention that is performed subsequently to the simultaneous biaxial stretching, either one of the lengthwise and widthwise directions of a polyester film may be firstly stretched. Preferably, widthwise stretching is effected at a first stage and lengthwise stretching at a second stage. In this order of stretching, film strength can be improved in the lengthwise and widthwise directions without film breaking, and much room is left for physical properties to be achieved in the two directions. This is due to the fact that when the successive biaxial stretching after the simultaneous biaxial stretching is performed particularly in a single stretching apparatus in which the distance between clips is set variable, widthwise stretching is effected while the distance between clips is being still held short and while the number of clips per unit length is still held large. This way of stretching avoids stress concentration that would excessively occur in a film region nearer to the clips, thus preventing film breakage.

In the present invention, it is also desired that mild stretching be effected, after the successive biaxial stretching subsequent to the simultaneous biaxial stretching and before heat treatment, in a direction normal to the direction of stretching at a second stage in the successive biaxial stretching. By the mild stretching, the physical properties of a polyester film are controlled in its lengthwise and widthwise directions. The stretch temperature and stretch ratio for use in the mild stretching are set within the range of (T3+10° C.) to (Tm−10° C.) and within the range of 1.01 times to 1.2 times, respectively, under which film breaking can be prevented.

When the biaxially oriented polyester film of the present invention has a Young's modulus of not smaller than 5.0 GPa in a widthwise direction and a total Young's modulus of not smaller than 12.0 GPa in the lengthwise and widthwise directions, a polyester film can be formed, without film breakage, which film has enhanced strength in the two directions. Advantages of this invention are much more significant.

When the biaxially oriented polyester film of the present invention has a particularly small thickness, that is, in the range of 0.3 $\mu$m to 10 $\mu$m, a biaxially oriented polyester film can be obtained without film breakage. Thus, this invention is even more advantageous.

Method of Determining Physical Properties and Method of Evaluating Results (1) Glass Transition Temperature Tg and Melting Point Tm DSC (RDSC 220) manufactured by Seiko Instruments & Electronics Ltd. was used as a differential scanning calorimeter, and Disk Station (SSC/5200) manufactured by the above company was used as a data analyzer. A sample of about 5 mg in amount was put in an aluminum pan and melted at 300° C. for 5 minutes, and the melt was quenched to solidify with liquid nitrogen. Measurement was made with a temperature rise of 20° C./min at from room temperature. In the endothermic-exothermic curve thus obtained, a stepped curve was taken as representing the glass transition temperature Tg and a melt peak temperature as representing the melting point Tm.

(2) Intrinsic Viscosity

This is expressed by a numerical value derived from measurement at a concentration of 0.1 mg/ml at 25° C. in o-chlorophenol. The unit is dl/g.

(3) Birefringence

This was counted by retardation determination with a polarized microscope (light source: a sodium lamp). The Berek Compensator method was used.

(4) Young's Modulus

Measurement was made at 25° C. and 65% RH with an Instron type tensile tester. The method provided by JIS-Z1702 was used.

EXAMPLES

The present invention is described hereinbelow with reference to examples.

Example 1

Pellets of polyethylene terephthalate (PET), of 78° C. in glass transition temperature Tg, 255° C. in melting point Tm and 0.62 dl/g in intrinsic viscosity, were vacuum-dried at 180° C. for 4 hours, supplied into an extruder and melted therein at 280° C., allowed to pass through a filter and then discharged from a T-die, followed by electrostatic casting onto a cooling drum of 25° C. in surface temperature and by successive solidification thereon. Thus, a 100 $\mu$m-thick, 95-mm wide cast film was obtained. This cast film was of a substantially unoriented nature with a birefringence of 0.001.

The resulting film was cut lengthwise in a length of 95 mm and shaped into a square with all sides of 95 mm. With a biaxial stretching tester (of a standard type) manufactured by Toyo Seiki Ltd., the square film was simultaneously biaxially stretched at 95° C. at a stretch ratio of 3.0 times in each of the lengthwise and widthwise directions, followed by monoaxial widthwise stretching at a stretch ratio of 1.6 times at 150° C. and thereafter by monoaxial lengthwise stretching at a stretch ratio of 15 times at 180° C. Heat treatment was then effected at 210° C. The Young's moduli of the polyester film thus biaxially oriented was 6.5 GPa in the lengthwise direction and 6.5 GPa in the widthwise direction. A biaxially oriented polyester film was obtained in which improved strength was well balanced in the lengthwise and widthwise directions.

Example 2

The same cast film and biaxial stretching tester as used in Example I were employed. The film was simultaneously stretched lengthwise and widthwise, respectively, at a stretch ratio of 3.0 times at 95° C., followed by monoaxial widthwise stretching at a stretch ratio of 1.8 times at 150° C. and thereafter by monoaxial lengthwise stretching at a stretch ratio of 1.2 times at 180° C. Heat treatment was then effected at 210° C. The Young's moduli of the polyester film thus biaxially oriented was 5.5 GPa in the lengthwise direction and 8.0 GPa in the widthwise direction. A biaxially oriented polyester film was obtained which had improved strength particularly in the widthwise direction.

Example 3

The same cast film and biaxial stretching tester as used in Example I were employed. The film was simultaneously stretched lengthwise and widthwise, respectively, at a stretch ratio of 3.0 times at 95° C., followed by monoaxial lengthwise stretching at a stretch ratio of 1.8 times at 150° C. and thereafter by monoaxial widthwise stretching at a stretch ratio of 1.2 times at 180° C. Heat treatment was then effected at 210° C. The Young's moduli of the polyester film thus biaxially oriented was 8.0 GPa in the lengthwise direction and 5.5 GPa in the widthwise direction. A biaxially oriented polyester film was obtained which had improved strength particularly in the lengthwise direction.

Example 4

The same cast film and biaxial stretching tester as used in Example 1 were employed. The film was simultaneously stretched lengthwise and widthwise, respectively, at a stretch ratio of 3.0 timesat 95° C., followed by monoaxial lengthwise stretching at a stretch ratio of 1.8 times at 150° C. and thereafter by monoaxial widthwise stretching at a stretch ratio of 1.2 times at 180° C. Subsequently, monoaxial lengthwise stretching was further performed at a stretch ratio of 1.1 times at 180° C. Heat treatment was then effected at 210° C. The Young's moduli of the polyester film thus biaxially oriented was 9.0 GPa in the lengthwise direction and 5.3 GPa in the widthwise direction. A biaxially oriented polyester film was obtained which was even more greatly strong particularly in the lengthwise direction.

Comparative Example 1

The same cast film as used in Example 1 was simultaneously stretched lengthwise and widthwise, respectively, at a stretch ratio of 4.5 times at 95° C., with a biaxial stretching tester. Heat treatment was then effected at 210° C. The Young's moduli of the polyester film thus biaxially oriented was 4.5 GPa in the lengthwise direction and 4.5 GPa in the widthwise direction. Improved strength was not observed.

Comparative Example 2

The same cast film as used in Example 1 was simultaneously stretched lengthwise and widthwise, respectively, at a stretch ratio of 4.6 times at 95° C., with a biaxial stretching tester. However, no biaxially oriented polyester film could be formed due to film breaking.

Industrial Applicability

According to the present invention, a film with small thickness and great strength in the lengthwise and widthwise directions can be efficiently obtained, without troublesome film breakage, by subjecting a polyester film to simultaneous biaxial stretching in its lengthwise and widthwise directions, followed by successive biaxial stretching in the lengthwise and widthwise directions in the same stretching apparatus used for the simultaneous biaxial stretching.

What is claimed is:

1. A multiple-step process for producing a biaxially oriented polyester film, comprising:

(X) subjecting a substantially unoriented polyester film to simultaneous biaxial stretching both lengthwise and widthwise in a stretching apparatus constructed to simultaneously stretch the polyester film in the lengthwise and widthwise directions thereof, and (Y) subsequently subjecting the polyester film produced by step (X) to successive but not simultaneous biaxial stretching steps, in any order, one in the lengthwise and the other in the widthwise direction thereof, said successive steps being performed, in the same apparatus being used for the said simultaneous biaxial stretching steps.

2. A process according to claim 1, wherein, after completion of said simultaneous biaxial stretching (X), the successive stretching is performed such that widthwise stretching is first effected, followed by performing lengthwise stretching.

3. A process for producing a biaxially oriented polyester film according to claim 1, wherein said simultaneous biaxial stretching (X) is performed at a temperature (T1) in the range of Tg+5° C. to Tg+40° C., Tg being the glass transition temperature of the polyester film, and at a stretch ratio in the range of 2.0 times to 4.0 times in both of the lengthwise and widthwise directions of the polyester film.

4. A process for producing a biaxially oriented polyester film, comprising:

(X) subjecting a polyester film to simultaneous biaxial stretching in a stretching apparatus constructed to simultaneously stretch the film in the lengthwise and widthwise directions thereof, at a temperature (T1) in the range of Tg+5° C. to Tg+40° C., Tg being the glass transition temperature of the film, and at a stretch ratio in the range of 2.0 times to 4.0 times in both the lengthwise and widthwise directions thereof; and subsequently, in the same apparatus as used above, (Y) effecting monoaxial stretching in the widthwise direction of the film at a temperature (T2) in the range of (T1+30° C.) to Tm−30° C., Tm being the melting point of polyester, and at a stretch ratio in the range of 1.05 times to 2.0 times;

thereafter effecting monoaxial stretching in the lengthwise direction of the film at a temperature (T3) in the range of T2 to (Tm−20° C.), and at a stretch ratio in the range of 1.05 times to 2.0 times; and then effecting heat treatment at a temperature in the range of T3 to (Tm−10° C.).

* * * * *